O. F. Hale, Ditching Machine.

No. 119,759.　　　　　　　　　　　Patented Oct. 10, 1871.

Witnesses:
C. Raettig
Gustave Dieterich

Inventor:
O. F. Hale
per Munn & Co
Attorneys.

UNITED STATES PATENT OFFICE.

OSCAR F. HALE, OF IRVINGTON, IOWA.

IMPROVEMENT IN DITCHING-MACHINES.

Specification forming part of Letters Patent No. 119,759, dated October 10, 1871.

*To all whom it may concern:*

Be it known that I, OSCAR F. HALE, of Irvington, in the county of Kossuth and State of Iowa, have invented a new and useful Improvement in Ditching-Machine; and I do hereby declare that the following is a full, clear, and exact description thereof, which will enable others skilled in the art to make and use the same, reference being had to the accompanying drawing forming part of this specification, in which—

Figure 1:
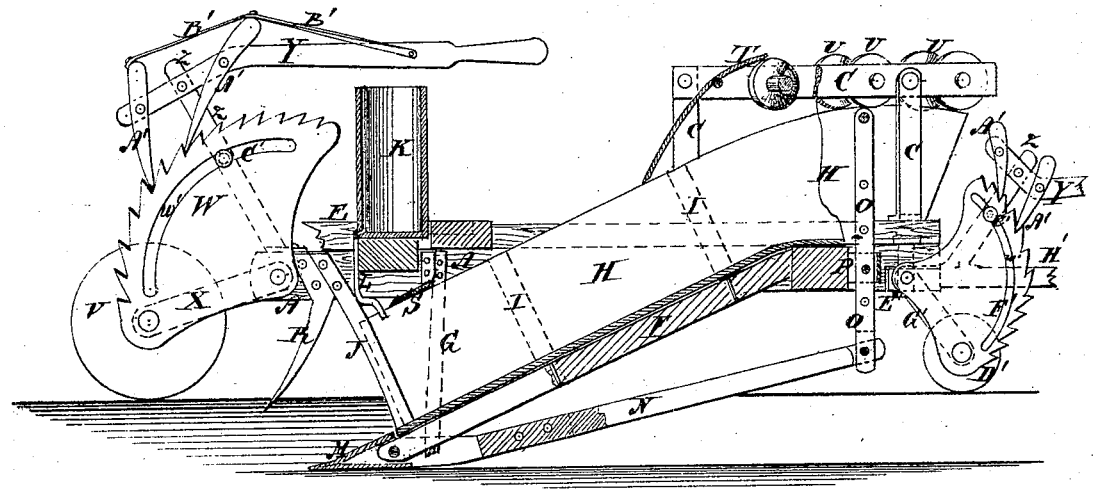
Figure 2:
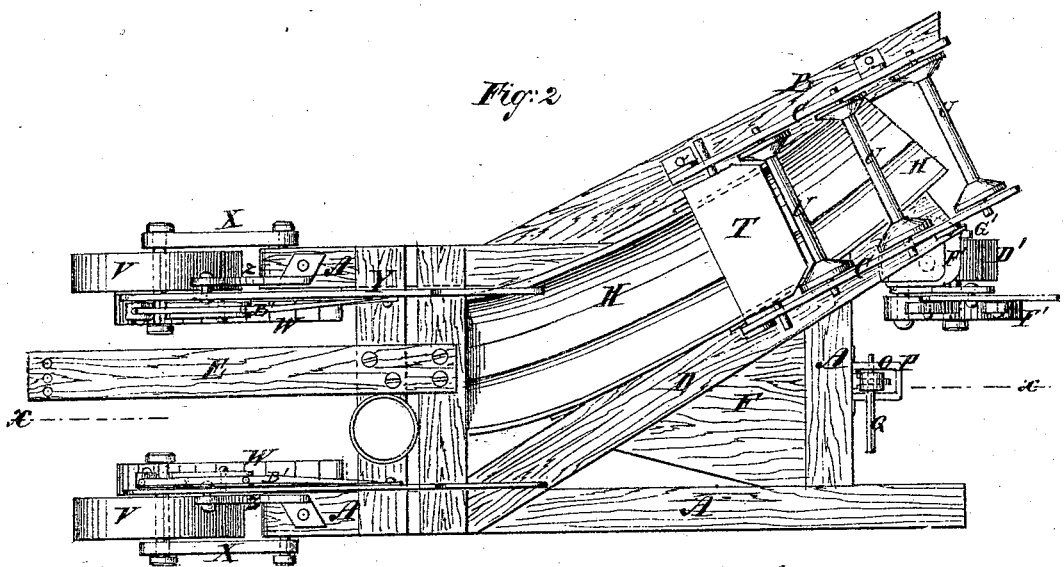

Figure 1 is a detail sectional view of my improved machine taken through the line $x\ x$, Fig. 2. Fig. 2 is a top view of the same.

Similar letters of reference indicate corresponding parts.

My invention has for its object to furnish an improved machine for forming open ditches, which shall be simple in construction, convenient in use, and effective in operation, depositing the dirt in a ridge at a distance from the edge of the ditch and placing the sod upon the ditch side of said ridge of dirt; and it consists in the construction and combination of the various parts of the machine as hereinafter more fully described.

A is the main frame of the machine, the rear cross-bar of which projects at the right-hand side to support the rear end of the inclined beam B that supports the right-hand side of the sod-carrier frame C, the left-hand side of which is attached to and supported by the inclined beam D attached to the main frame A. To the forward part of the frame A is attached the draw-bar E, which is placed a little to the right of the central line of said frame A to counteract the tendency to side draft. Several holes for the attachment of the draft should be formed in the forward end of the draw-bar E to enable the draft-line to be adjusted as required. F is the platform that supports the mold-board, which is placed in an inclined position, and the rear end of which is securely attached to the rear cross-bar of the main frame A. The forward end of the platform F is supported by the iron bars G, the upper ends of which are attached to the frame A, and which also support the lower part of the sides of the mold-board H. The upper part of the sides of the mold-board H are supported by the bars I, as shown in Fig. 1. Cutters J J are attached to the forward edges of the mold-boards. Water may be used to lubricate the said mold-boards, and is in that case discharged just in rear of the thick backs of the knives J. The water for lubrication is carried in a tank, K, attached to the frame A, and from which small pipes L conduct the water to the required points. M is the plow-point, which is made of wrought-iron heavily plated with steel, and which is recessed to receive the rounded-off forward end of the mold-board platform F, to which it is pivoted. The sides of the plow-point M project to the rearward and are secured to the forward end of the lever N, which inclines upward toward the rearward, and to its rear end is pivoted the lower end of the bar O, which passes up through a guide or keeper, P, attached to the rear cross-bar of the frame A, where it is adjustably secured in place by a pin, Q, passing through a hole in the said keeper and through one of the holes in the said bar. By this construction the plow-point M may be inclined upward to cause the machine to run out of the ground, or inclined downward to enter the ground to any desired depth. R are knives attached to the forward part of the frame A, and projecting downward in line with the main knives J to such a depth as to reach as low as the roots of the grass. The frame A in front of the knives R is cut away or recessed to form a space to prevent the said knives from becoming clogged. S is a horizontal knife attached to the frame A in the rear of the knives R, and either in front or rear of the knives J, to separate the sod from the dirt beneath it. The sod moves back upon the top of the dirt until it comes to the inclined apron or guide T attached to the carrier-frame C, when it passes up the apron T to the rollers or carrier U pivoted to the frame C, and by which the sod is placed upon the ditch side of the ridge of dirt carried out by the mold-board H. The forward end of the frame A is supported by the wheels V, which are pivoted to and between the lower corner of the segmental ratchet-wheel W and the lower end of the bars X. The upper ends of the bars X and the ratchet-wheels W at their centers are pivoted to the forward ends of the side bars of the frame A. Y are levers which are pivoted to standards Z. To the forward part of each of the levers Y are pivoted two pawls, A', which may be weighted or provided with springs to hold them down upon the teeth of the segmental ratchet-wheels W F'. When the wheels V D' are to be raised, or rather when the body of the machine is to be lowered, springs B' are connected with the upper ends of the pawls A' and with the levers Y, so as to enable the pawls to be alternately operated or engaged with the ratchet-wheels. In the ratchet-wheels are formed curved slots $w'$, through which passes a bolt, C', which also passes through a hole in the lever-standard Z, so that the wheels V D' can be readily secured in place when adjusted. The wheel F' is connected with the block E', which is swiveled to a projecting rear part of the frame A, so that the said wheel D' may act as a caster-wheel in turning and guiding the machine.

Having thus described my invention, I claim as new and desire to secure by Letters Patent—

1. The combination of the frame-work A B D, platform F, mold-boards H, plow-point M, lever N, pivoted adjusting-bar O, bars G I, knives J, knives R, tank K, and pipes L with each other, substantially as herein shown and described and for the purpose set forth.

2. The combination of the horizontal knife S, inclined apron T, carrier U, and carrier-frame C with the knives R J, mold-boards H, and frame-work A B D, substantially as herein shown and described, and for the purpose set forth.

OSCAR F. HALE.

Witnesses:
KINSEY CARLON,
ALBERT REED. (114)